June 4, 1968   L. J. CZERWONKA   3,386,227
ELECTROSTATIC FILTER DEVICE
Filed Sept. 1, 1966

INVENTOR.
LAWRENCE J. CZERWONKA
BY
Ralph B. Brick
ATTORNEY 3,386,227
ELECTROSTATIC FILTER DEVICE
Lawrence J. Czerwonka, Louisville, Ky., assignor to American Air Filter Company, Inc., Louisville, Ky., a corporation of Delaware
Filed Sept. 1, 1966, Ser. No. 576,578
3 Claims. (Cl. 55—142)

ABSTRACT OF THE DISCLOSURE

A gas filter arrangement including successively stacked pleated sheets of filter medium spaced and separated by electrically conductive sheets sandwiched therebetween, the sheets being electrically charged to provide an intensified electrical potential gradient across the filter medium.

The present invention relates to gas filters and more particularly to an improved disposable type electrical gas filter.

In accordance with the present invention, an improved filter device is provided of a type like that disclosed in assignee's U.S. Patent No. 3,242,649, issued to Richard D. Rivers, on Mar. 29, 1966. The filter device of the present invention, in addition to its capability of effectively cleaning gas both electrically and by impingement serves to provide a unique low resistance arrangement for cleaning gas by sorption. Further, the improved electrical gas filter device of the present invention is compact, sturdy, and readily maintainable and, at the same time, is straightforward in construction and operation, permitting gas cleaning operations over a broad range of voltages, high gas handling capacity and high gas cleaning efficiency. In addition, the filter device of the present invention provides an effective electrostatic charge or potential gradient across dielectric filter medium to improve filtering efficiency and sorption and, at the same time, such novel structure maintains the filter medium in firm, pleat form with a maximum amount of medium provided in a given space to selectively channel a gas stream to be treated along and through the filter medium.

Various other features of the present invention will become obvious to one skilled in the art upon reading the disclosure set forth hereinafter.

More particularly, the present invention provides a gas filter apparatus comprising: a housing defining a gas flow passage therethrough for a gas stream to be treated; a plurality of pleated sheets of dielectric filter medium disposed within the housing in superposed relationship with the pleats of the sheets extending in longitudinal parallel relationship along the gas flow passage to provide gas stream channels extending along the line of gas flow; a plurality of electrically conductive separator sheets positioned to separate the pleated sheets of dielectric filter medium; and means on the housing in insulated relationship to directly contact and charge and ground the separator sheets in successively alternating fashion to provide an intensified potential gradient transverse the breadth of the filter medium therebetween. In addition, the present invention provides an arrangement wherein superposed pleated filter medium sheets are positioned in mirror image sheet relationship to provide a maximum flow-through tubular effect.

It is to be understood that various changes can be made in the arrangement, form, and construction of the apparatus disclosed herein without departing from the scope or spirit of the present invention.

Referring to the drawing which discloses an advantageous embodiment of the present invention and several modifications thereof:

Figure 5:
Figure 6:
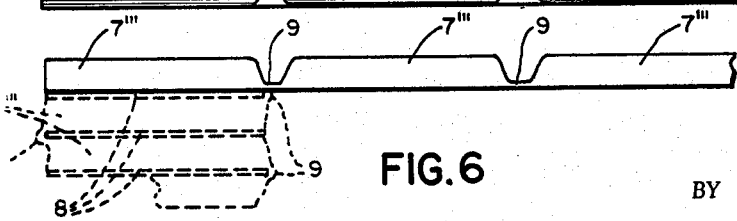

FIGURE 5 is a plan view of one form of dielectric filter medium which can be utilized, the adjacent sheets of the pleated medium being joined by flat, intermediate sections to provide a continuous strip of filter medium; and, FIGURE 6 is a side view of the continuous strip of filter medium disclosed in FIGURE 5, disclosing in broken lines the manner in which the medium can be arranged in pleat formation across the gas flow passage transverse the directional flow of the gas stream to be treated.

Figure 4:
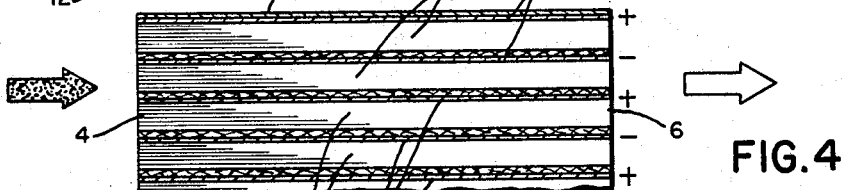
FIGURE 4 is a side elevational view of the apparatus of FIGURE 1 taken in a plane passing through line 4—4 of FIGURE 1.

As can be seen in the drawing, an inventive electrical gas filter 2 is disclosed. Referring to FIGURE 4, filter 2 includes an open end rectangular shaped housing 3 having dirty gas inlet 4 and clean gas outlet 6, the housing serving to define the gas flow passage through which the gas stream to be treated is passed. Housing 3 can be constructed from any one of a number of known inexpensive, dielectric, and disposable materials. For example, chipboard, cardboard, or a suitable dielectric plastic material can be used.

Figure 1:
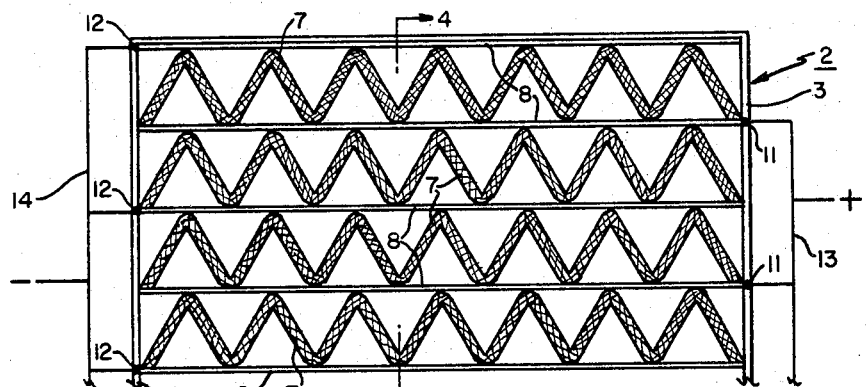
FIGURE 1 is a partially broken away, cross-sectional end elevational view of the inventive apparatus.
Figure 2:
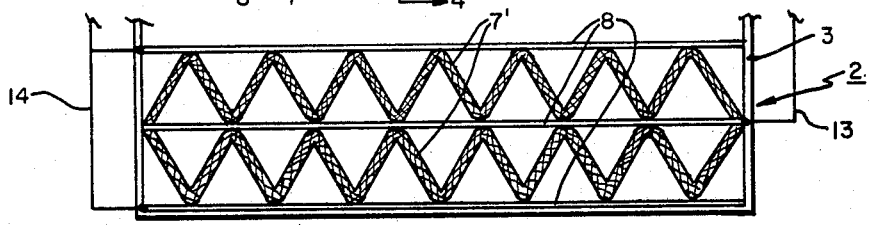
FIGURE 2 is a view similar to FIGURE 1 showing a modified manner of positioning the superposed sheets of dielectric filter medium.
Figure 3:
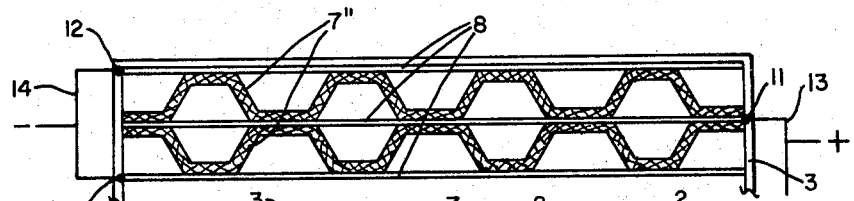
FIGURE 3 is a view similar to that of FIGURES 1 and 2 showing a still further modification in the superposed sheets of dielectric filter medium.

Positioned in housing 3 in superposed or stacked relationship are a plurality of pleated sheets of dielectric filter medium 7. The sheets are so positioned that the pleats of the medium extend in longitudinal parallel relationship along the gas flow passage to provide gas stream channels extending along the line of gas flow (attention being directed particularly to FIGURE 4). Because of the pleat formation and the nature of the filter medium 7, high gas handling capacity, low gas flow resistance and high gas cleaning efficiency is provided. In this connection, it is to be noted that the gas flow passage in the embodiments of FIGURES 1–3 is such as to extend throughout filter unit 2 from dirty gas inlet 4 through clean gas outlet 6 without interruption so as to provide a low resistance arrangement. Filter medium sheets 7 can be comprised of any one of a number of known, porous, dielectric, impingement filtering materials, the medium being of sufficient rigidity either through chemical treatment or by the nature of the material to permit a folding thereof to provide the pleated sheets aforedescribed. For example, a porous polyurethane fabric or a thin, matted, porous filter paper of several layers can be utilized. Advantageously, a thin, glass fiber mat made from interconnected and bonded fibers which form a maze of interstices therebetween can be used, the fiber diameters of such glass fiber mat advantageously being in the range of approximately 0.5 to 20.0 microns to provide a filter medium with higher sorptive qualities as compared to mats of larger filter diameters which offer less surface area to the gases being treated.

To maintain the pleated sheets of dielectric filter medium 7 in separated position from each other, a plurality of electrically conductive separator sheets 8 are provided. These separator sheets can be formed from any of a number of known sturdy, pliable electrically conducted materials and advantageously a thin, metallic, aluminum foil can be used.

As can be seen in FIGURES 1–3 of the drawing, the opposite inner side walls of dielectric housing 3 are each provided with one of two sets 11 and 12 of spaced, parallel electrically conductive stripes. These stripes can be formed from aluminum foil material and can be fastened to the inner walls of housing 3 by a suitable adhesive or by staples. Advantageously, the stripes can be painted on the housing walls with an electrically conductive paint before the housing is erected, in the manner of a printed circuit. The stripes of each stripe set 11 and 12 are so spaced that the stripes of one set 11 of one side wall electrically connect with the adjacent wall abutting edge of every other separator 8 and the stripes of the other set 12 on the opposite wall electrically connect with the adjacent abutting edges of the remaining separators 8. Thus, interleaved sets of separators 8 are provided one of which sets of separators can be electrically charged and the other of which can be grounded to establish an electrostatic potential gradient across the filter medium sheets 7 therebetween. In this connection, it is to be noted that the stripes of set 11 are each connected at one end thereof to an electrically conductive bus stripe 13 and the stripes of set 12 are each connected at one end thereof to an electrically conductive bus stripe 14. The bus stripe 13 is arranged to be insulated from the set of spacing members 8 connected to the stripes of set 12 and the bus stripe 14 is arranged to be insulated from the set of spacing members 8 connected to the stripes of set 11. Advantageously, this can be accomplished by placing the bus stripes 13 and 14 on the outer opposite side walls of housing 3 and electrically connecting each to its set of stripe ends by means of metallic staples. It is then only necessary to connect one of the bus stripes to ground and the other to a suitable electrical charge from a power pack (not shown) to provide a potential gradient across the dielectric filter medium 7 disposed between separator members 8. It is to be noted that by virtue of the flat metal sheets which are utilized to conduct the electrostatic charge that high voltages can be employed across these sheets to increase efficiency. It further is to be noted that since the filter medium sheets are in pleated form a maximum amount of filter medium can be arranged in housing 3 to give optimum filtering capacity.

Referring to FIGURE 2 of the drawing, it can be seen that sheets of filter medium 7 can be arranged so that successive sheets are positioned in alternating mirror image relationship to each other to provide a plurality of tubular-like passages. Further, as can be seen in FIGURE 3, the filter medium sheets can be of such a nature as to be three-sided as at 7″ so as to provide a modified tubular-type gas passage arrangement.

As can be seen in FIGURES 5 and 6 of the drawings adjacent sheets 7‴ of the pleated filter medium sheets of dielectric filter medium can be joined by flat intermediate sections 9 to provide a continuous integral strip of filter medium such as disclosed in FIGURE 5. This integral strip of filter medium which can be substituted for the filter mediums in the apparatus of FIGURES 1 through 4 can be arranged in zigzag form about separators 8 as disclosed by the broken lines in FIGURE 6 to provide a continuous strip of pleated filter medium sheets which strip extends, in turn, in pleat formation across the gas flow passage transverse the direction of the flow of the gas stream to be treated.

The invention claimed is:

1. A gas filter apparatus comprising: a housing having an upstream dirty gas inlet and a downstream clean gas outlet defining a gas flow passage therebetween for a gas stream to be treated; a continuous sheet of pleated dielectric filter medium folded back and forth upon itself within said housing to form a first set of pleats the crests of which extend transverse to the direction of flow of the gas stream to be treated, the flanks of said first set of pleats being pleated to form a second set of pleats extending in longitudinal parallel relationship along the gas flow passage and providing gas stream channels extending between said dirty gas inlet and said clean gas outlet along the line of gas flow; a plurality of separate spaced parallel electrically conductive separator sheets sandwiched between said first set of pleats of dielectric filter medium and spacing and separating said first set of pleats of dielectric filter medium; and first and second means on said housing in electrically insulated relationship from each other and directly contacting said electrically conductive separator sheets in successively alternating fashion and providing an intensified electrical potential gradient transverse the breadth of said filter medium therebetween.

2. The apparatus of claim 1, the second set of pleats in the flanks of said first set of pleats of dielectric filter medium being positioned in successively alternating mirror image relation to each other and providing a plurality of tubular type passages.

3. The apparatus of claim 1, said pleated sheet of dielectric filter medium being of a glass fibrous type with fiber diameter in the range of approximately 0.5 to 20.0 microns.

References Cited

UNITED STATES PATENTS

| | | | |
|---|---|---|---|
| 2,297,601 | 9/1942 | Williams | 55—132 |
| 2,381,455 | 8/1945 | Jacob | 55—102 |
| 2,422,825 | 6/1947 | Davis | 55—521 X |
| 2,522,568 | 9/1950 | Dahlman | 55—132 |
| 2,650,672 | 9/1953 | Barr et al. | 55—138 |
| 2,908,350 | 10/1959 | Buckman | 55—521 X |
| 3,025,964 | 3/1962 | Summers et al. | 55—502 X |
| 3,107,986 | 10/1963 | Plaut et al. | |
| 3,242,649 | 3/1966 | Rivers | 55—122 |
| 3,246,767 | 4/1966 | Pall et al. | |

FOREIGN PATENTS

| | | |
|---|---|---|
| 600,967 | 7/1960 | Canada. |
| 888,585 | 7/1960 | France. |
| 963,829 | 8/1957 | Germany. |

HARRY B. THORNTON, *Primary Examiner.*

D. TALBERT, *Assistant Examiner.*